Jan. 28, 1964   L. G. SNEED   3,119,638
TRAILER HOUSE COMBINATION
Filed Nov. 20, 1962   3 Sheets-Sheet 1
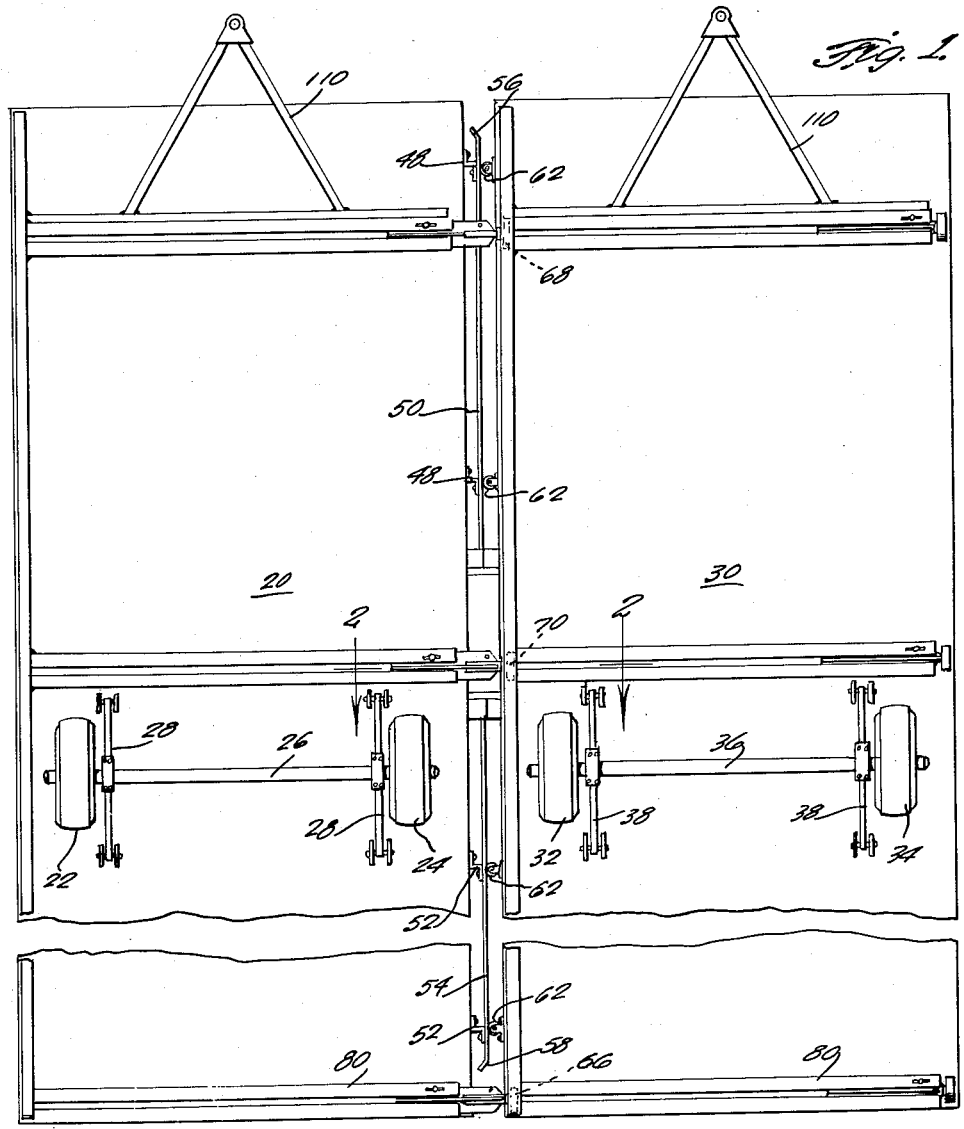
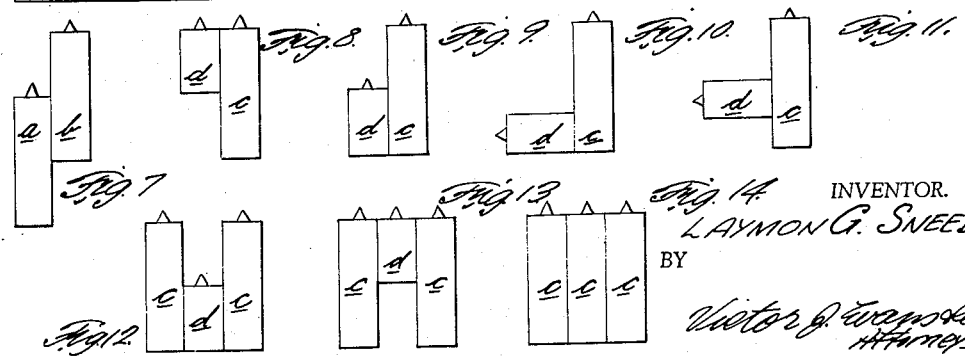
INVENTOR.
LAYMON G. SNEED
BY

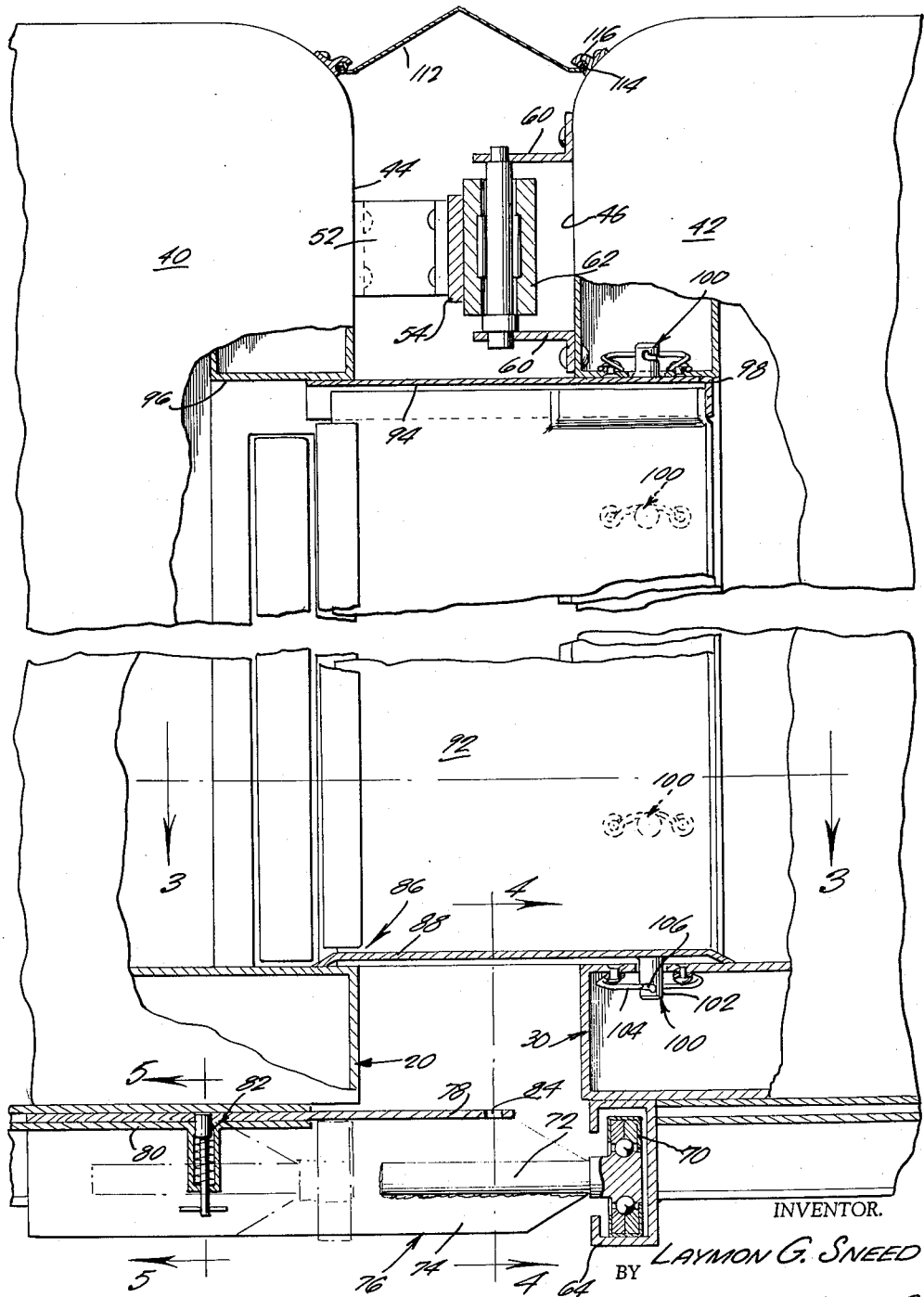

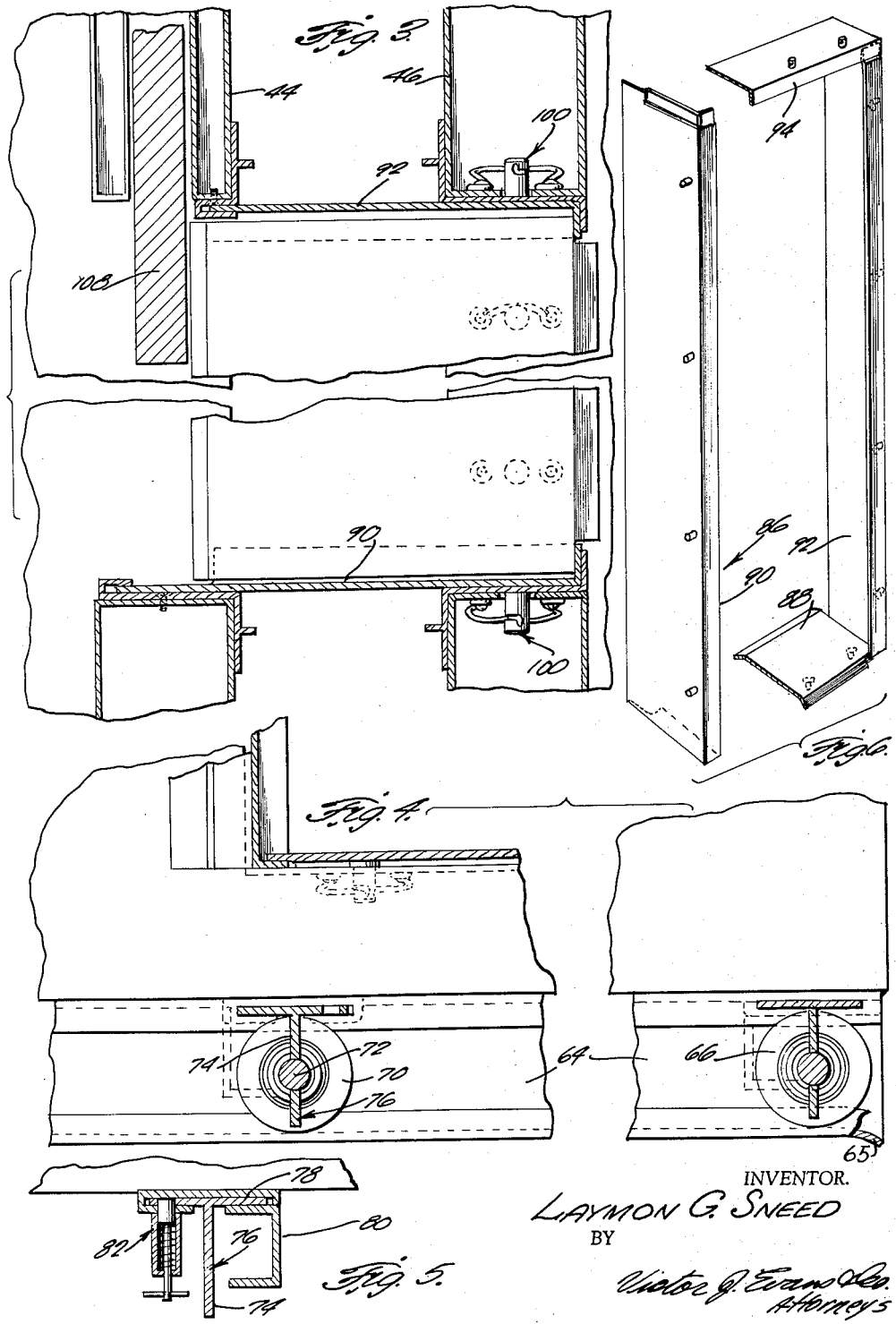

United States Patent Office 3,119,638
Patented Jan. 28, 1964

3,119,638
TRAILER HOUSE COMBINATION
Laymon G. Sneed, Rte. 1, Box 97A, Kilgore, Tex.
Filed Nov. 20, 1962, Ser. No. 238,904
2 Claims. (Cl. 296—23)

The present invention relates to mobile trailers generally and in particular to a combination house using at least two trailers.

An object of the present invention is to provide a combination house employing two trailers, the trailers having interengaging means for alignment of one trailer against the other, and the trailers having a doorway therebetween.

Another object of the present invention is to provide in a trailer house construction, means for securing two units together in any desired position relative to each other.

A further object of the present invention is to provide, in a trailer house construction, an inexpensive method of joining two units together, and an inexpensive method of providing a doorway between the two joined units.

These and other objects and advantages of the invention will be fully apparent from the following description when taken in connection with the annexed drawings, in which:

FIGURE 1 is a bottom plan view of the trailer house combination according to the present invention, portions of the two trailer frames being broken away, FIGURE 2 is a view on an enlarged scale, taken on the line 2—2 of FIGURE 1, FIGURE 3 is a view taken on the line 3—3 of FIGURE 2 with a portion broken away, FIGURE 4 is a view on the line 4—4 of FIGURE 2, FIGURE 5 is a view taken on the line 5—5 of FIGURE 2, FIGURE 6 is an exploded view in perspective of the door frame, and FIGURES 7 to 14 are schematic diagrams showing how two or more trailer units may be connected together to form a combination house.

Referring to the drawings in detail in which like numerals indicate like parts throughout the several views, the numeral 20 in FIGURE 1 designates a first mobile frame supported on wheels 22 and 24. The wheels 22 and 24 are supported upon an axle 26 suspended from the frame 20 by means of spring structures 28.

A second frame 30 is supported upon wheels 32 and 34 on the ends of an axle 36 which is supported in depending relation from the frame 30, on spring structures 38.

Building structures 40 and 42 are carried by the frames 20 and 30, respectively, and the building structure 40 includes a vertical wall 44. The building structure 42 includes another vertical wall 46.

As shown in FIGURES 1 and 2, the wall 44 has two brackets 48 projecting outwardly therefrom adjacent the upper end of the wall 44. A first rail 50 is carried by the brackets 48. Another pair of brackets 52 adjacent the other end of the wall 44 support another rail 54. The outward ends of the rails 50 and 54 are bent toward the wall 44, as shown most clearly in FIGURE 1 and indicated by the reference numerals 56 and 58, respectively.

The wall 46 of the building structure 42 carries brackets 60 which support rollers 62, as shown most clearly in FIGURE 2.

Cooperating interengaging securing means is provided for holding the structures 40 and 42 together and this means consists in a channel member disposed horizontally and facing outwardly of the lower end of the wall 46 and fixedly secured and made a part of the frame, the channel member being designated by the numeral 64.

The channel member 64 extends the full length of the frame 30 and within it is a roller 66 adjacent one end of the frame 20 and another roller 68 is adjacent and spaced from the other end of the frame 20. The rollers 66 and 68 are telescopically mounted on the frame 20 as shown in detail in FIGURES 4 and 5 so that the rollers 66 and 68 may be retracted when the frame 20 is detached from the frame 30 and moved over a highway. The channel member 64 is formed with a lip 65 at one end permitting movement of the rollers 66 and 68 into the channel member 64 when the frame 20 is shifted relative to the frame 30.

Another roller 70 is mounted intermediate the ends of the frame 20 and is also rollably supported in the channel member 64, as shown in FIGURE 2. As all of the rollers 66, 68, and 70 are identical and their main means of attachment to the frame 20 are the same, they will be described with reference to the roller 70 as shown in FIGURES 4 and 5.

The roller 70 is mounted upon one end of a shaft 72 which is welded to the stem 74 of a T-shaped member 76. The web 78 of the member 76 is slidably supported in a box structure 80 depending from the frame 20.

A lock pin assembly 82 is seatable in a hole provided in the web 78 for restraining longitudinal movement of the T-shaped member 76 so as to prevent movement of the frames 20 and 30 away from each other once they have been positioned in a desired locality. The web 78 has a hole 84 adjacent one end thereof for locking the T-shaped member 76 in the retracted position when the frames 20 and 30 are not attached to each other.

The frame 30 is also provided with T-shaped members 76 adjacent the front and rear and intermediate the ends thereof for hooking on another frame as desired.

In use, as shown in FIGURES 7 to 14, inclusive, several units may be attached to each other using the T-shaped members 76 and the rollers 66, 68, and 70 as desired. In FIGURE 7 two units "a" and "b" are joined together in overlapping relation. In FIGURES 8 to 11, a large unit "c" is employed with a small unit "d" in several positions. In FIGURES 12 and 13 two large units "c" and small unit "d" are secured together and in FIGURE 14 three large units "c" are connected together for use as a trailer home.

A feature of the invention resides in the provision of a doorway between the two units or building structures 40 and 42 as shown in FIGURES 2 and 3.

This means consists in a door frame 86 having a sill 88, side jams 90 and 92, and a header 94, assembled within openings 96 and 98 provided in the adjacent walls 44 and 46.

Snap fastener assemblies 100 secure the elements of the door frame 86 to the adjacent parts of the walls 44 and 46, such snap fastener assemblies being conventional and consisting in a pin 102 and a spring wire 104 seatable in a groove 106 provided in the pin 102.

A sliding door 108 closes the opening made by the door frame 86 when it is desired to isolate the interior of the building structure 40 from the interior of the building structure 42.

Each of the frames 20 and 30 is provided with a tongue 110 by means of which the trailer is moved from place to place behind a towing vehicle in the conventional manner.

It will be seen therefore that the present invention provides a means for making a large building structure or home from two or more units which are mounted on mobile frames, provision being made for joining the units together and for a doorway between the units.

The space between the units is protected by a V-shaped shield 112 (FIGURE 2) having its side edges rolled, as at 114 and fitted into elongated strips 116. This prevents exposure of the rails 54 and rollers 62 to the elements and also protects the door frame 86 from inclement weather.

While only a preferred form of the invention has been shown and described other embodiments are contemplated and numerous changes and modifications may be made therein without departing from the spirit of the invention as set forth in the appended claims.

What is claimed is:

1. A trailer house combination comprising a pair of mobile frames, a building structure carried on each frame, each of said structures including a vertical wall, a horizontally disposed rail carried on the exterior face of one of said walls adjacent the upper end thereof, a roller supported on the exterior face of the other of said walls and adapted to roll along said rail responsive to longitudinal movement of one of said frames relative to the other of said frames, a horizontally disposed outwardly facing channel member carried on one of said frames adjacent to and below the associated wall, a roller telescopingly mounted on the other of said frames and disposed within said channel member for rolling movement therealong responsive to longitudinal movement of said another of said frames relative to said one frame, and means for locking said roller relative to said other frame.

2. A trailer house combination comprising a pair of mobile frames, a building structure carried on each frame, each of said structures including a vertical wall, a horizontally disposed rail carried on the exterior face of one of said walls adjacent the upper end thereof, a roller supported on the exterior face of the other of said walls and adapted to roll along said rail responsive to longitudinal movement of one of said frames relative to the other of said frames, a horizontally disposed outwardly facing channel member carried on one of said frames adjacent to and below the associated wall, a roller telescopingly mounted on the other of said frames and disposed within said channel member for rolling movement therealong responsive to longitudinal movement of said another frames relative to said one frame, means for locking said roller relative to said other frame, a portion of each of said walls being provided with an opening, said openings being in registry, and a door frame including a sill disposed in said openings and bounding the edges of said openings.

References Cited in the file of this patent

UNITED STATES PATENTS

| | | |
|---|---|---|
| 2,247,340 | Webster | June 24, 1941 |
| 2,363,259 | Penton | Nov. 21, 1944 |
| 2,893,066 | Perdue | July 7, 1957 |
| 2,924,829 | Mosier | Feb. 16, 1960 |